Jan. 1, 1935.  R. U. THORNTON  1,986,612
BEAM HEAD
Filed March 17, 1934
Fig.2.  Fig.1.  Fig.3.
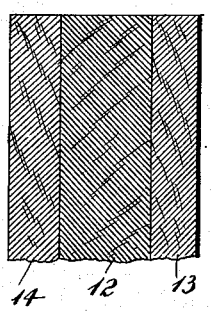
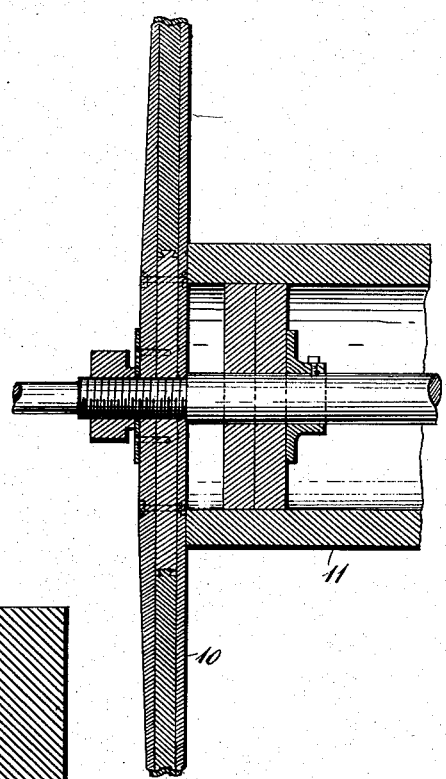
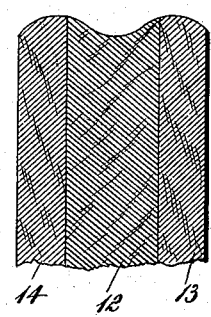
Fig.4.
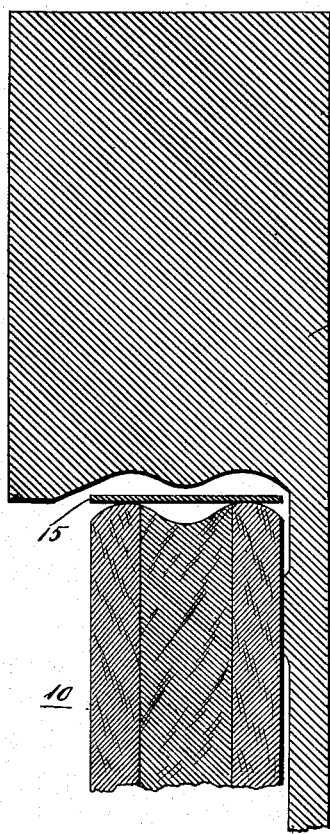
Fig.5.
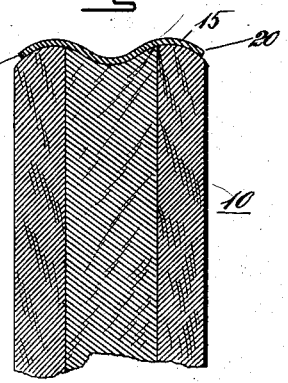
INVENTOR:
Ray Udell Thornton
By Geo. A. Woodworth
ATTORNEY:

Patented Jan. 1, 1935

1,986,612

UNITED STATES PATENT OFFICE 1,986,612

BEAM HEAD

Ray Udell Thornton, New Bedford, Mass.

Application March 17, 1934, Serial No. 716,211

2 Claims. (Cl. 242—124)

Multi-ply beam heads of the type shown in the patents to Ray Thorton, Nos. 1,239,744, dated Sept. 11, 1917 and 1,470,946, dated Oct. 16, 1923, require metallic tires to bind together the layers of wood of which the head is formed and such tires are usually grooved to receive the restraining cord.

It has been found in practice that when the edges of such tires are flush with the sides of the head the peripheral portions of the sides of the head eventually become worn or abraded in whole or in part and that as a consequence the edges of the tire project beyond the sides of the head either in whole or in part. Such projecting metallic edges of the tire constitute a source of danger to the operatives and also cause loss of material due to the yarn being cut by said projecting edges during the winding and unwinding operations.

It is therefore the object of my invention to overcome this defect by employing a tire which terminates short of the sides of the head.

In the drawing which accompanies and forms a part of this specification—

Figure 1 is a central section showing a portion of a beam embodying my invention;

Fig. 2 is a section on an enlarged scale showing the peripheral portion of a three-ply beam head before the periphery thereof is shaped to receive a tire;

Fig. 3 is a similar section showing the peripheral portion of the head after the same has been cut to shape;

Fig. 4 is a fragmentary section illustrating the mode of applying a tire to a beam head;

Fig. 5 is a section of the peripheral portion of a beam head after the tire has been clamped thereto.

In the drawing selected for more fully disclosing the principle underlying my invention, 10 represents a beam head formed of three layers of wood, as more fully described in said Patent 1,239,744, and 11 is the barrel of the beam to which said head is secured.

In forming a beam head, according to the present invention, three discs of wood 12, 13, 14 are secured together in any suitable manner, and the resulting three-ply disc is then centered and turned to give the periphery thereof a compound curvature, as indicated in Fig. 3, the outer portions being convex upwardly and the intermediate or central portion concave. A relatively thin, flat rim or tire 15 of suitable metal is then placed around the periphery of the head, as indicated in Fig. 4 and the head placed within a suitable press having a die 16 shaped reversely to the curvature of the periphery of said head. By means of said press the tire is firmly clamped on the head and conforms to the shape thereof, as indicated in Fig. 5.

In order to reduce the weight of the completed head and render it suitable for spinning, the tire preferably is made relatively thin, and another reason for reducing the thickness of the tire is to enable the press to clamp the same to the head without employing greater pressure than the wooden head will resist without distortion. Experience has shown that whether the tire be thick or thin, as shown in said Patents 1,239,744 and 1,470,946, respectively, the abrasion of the outer faces of the head inevitably results in exposing the edge portions of the tire which will then overhang the peripheral portions of the outer discs of which the heads are formed, with the result that such edge portions frequently catch the operator's clothing and injure the yarn during the use of the beam.

This limitation of multi-ply beamheads is obviated by means of the present invention in which the edges 20 of the tire terminate short of the sides of the head. It has been found that by making the width of the flat tire approximately equal to the thickness of the head, the edges of the tire after the latter has been clamped to the head, will be withdrawn sufficiently far from the sides of said head to serve my purpose, without reducing the efficiency of the tire as a binder of the layers of wood forming the head.

Having thus described an illustrative embodiment of my invention without however limiting the same thereto, what I claim and desire to secure by Letters Patent is:

1. A beam head formed of at least three disks of wood suitably secured together and centered and turned to give the periphery thereof a compound curvature, the outer portions of the periphery being convex upwardly and the intermediate portion being concave, and a metallic rim of uniform thickness about the periphery of the beam head, said rim being shaped to conform to the contour of the periphery of the head, and the side edges thereof terminating short of the sides of the head and being located on the convex portions of the same beyond the apices thereof.

2. A multi-ply beam head comprising in its construction at least three discs of wood secured together at their meeting faces, the cross section of the periphery of said head having a compound curvature, the outer portions of which are convex upwardly and the intermediate portion concave, and a relatively thin metallic tire disposed on the periphery of said head and conforming throughout its width to the contour of said periphery, the side edges of said tire terminating short of the sides of said head but extending beyond the apices of said convex portions.

RAY UDELL THORNTON.